US010020998B2

(12) United States Patent
Gonzales et al.

(10) Patent No.: US 10,020,998 B2
(45) Date of Patent: Jul. 10, 2018

(54) DATA CENTER SERVICE ORIENTED NETWORKING

(75) Inventors: Lorenzo Gonzales, Rome (IT); Arkadiusz Giedrojc, Elblag (PL); Giuseppe Capaldo, Cremona (IT); Giovanni Giuliani, Varese (IT); Lorenzo Bosisio, Nova Milanese (IT); Peter Kilgour, Mortimer (GB); Roberto Marchetti, Pianezza (IT); Andrew Richardson, Hemel Hempstead (GB); Dario Brusamolino, Inzago (IT); Laura Figueroa Garcia, Madrid (ES); Riccardo Nappi, Palombara Sabina (IT)

(73) Assignee: Hewlett Packard Enterprise Development LP, Houston, TX (US)

( * ) Notice: Subject to any disclaimer, the term of this patent is extended or adjusted under 35 U.S.C. 154(b) by 87 days.

(21) Appl. No.: 14/387,985

(22) PCT Filed: Apr. 27, 2012

(86) PCT No.: PCT/US2012/035334
§ 371 (c)(1),
(2), (4) Date: Sep. 25, 2014

(87) PCT Pub. No.: WO2013/162588
PCT Pub. Date: Oct. 31, 2013

(65) Prior Publication Data
US 2015/0052229 A1 Feb. 19, 2015

(51) Int. Cl.
*H04L 12/24* (2006.01)
(52) U.S. Cl.
CPC .......... *H04L 41/50* (2013.01); *H04L 41/0806* (2013.01); *H04L 41/0813* (2013.01); *H04L 41/5041* (2013.01); *H04L 41/5054* (2013.01)

(58) Field of Classification Search
CPC . H04L 41/5041; H04L 41/50; H04L 41/0813; H04L 41/5054; H04L 41/0806
See application file for complete search history.

(56) References Cited

U.S. PATENT DOCUMENTS 6,631,119 B1   10/2003  Mawhinney et al.
7,437,341 B2   10/2008  Morgan
(Continued)

FOREIGN PATENT DOCUMENTS

WO   WO-2011008219 A1   1/2011

OTHER PUBLICATIONS

PCT; "Notification of Transmittal of the International Search Report and the Written Opinion of the International Searching Authority, or the Declaration"; cited in PCT/US2012/035334; dated Jan. 2, 2013; 8 pages.
(Continued)

*Primary Examiner* — Arvin Eskandarnia
*Assistant Examiner* — Juan C Turriate Gastulo
(74) *Attorney, Agent, or Firm* — Dierker & Associates

(57) ABSTRACT

A tangible machine readable storage medium stores instructions and implements a method when the instructions are executed by a processor. A service catalog (SC) includes a service unit (SU). The SU includes an array of service resources (SR) to define a service using end-user service-oriented terminology. The SU is assigned to a module. The module includes a component associated with a configuration and a device. An operational task is executed on the device to deploy the configuration on the device to implement the service.

20 Claims, 3 Drawing Sheets

(56) References Cited

U.S. PATENT DOCUMENTS

| | | | |
|---|---|---|---|
| 7,774,456 B1 | 8/2010 | Lownsbrough et al. | |
| 7,783,468 B2 | 8/2010 | Abu el Ata et al. | |
| 2003/0033519 A1 | 2/2003 | Buckman et al. | |
| 2006/0010445 A1* | 1/2006 | Peterson | G06F 21/6236 718/100 |
| 2008/0195731 A1 | 8/2008 | Harmel et al. | |
| 2008/0243629 A1* | 10/2008 | Chang | G06Q 10/06 705/26.5 |
| 2010/0050172 A1* | 2/2010 | Ferris | G06F 9/5072 718/1 |
| 2010/0153918 A1* | 6/2010 | Mallick | G06F 8/71 717/121 |
| 2011/0138047 A1 | 6/2011 | Brown et al. | |
| 2011/0209140 A1 | 8/2011 | Scheidel et al. | |
| 2012/0054624 A1* | 3/2012 | Owens, Jr. | G06F 9/5072 715/735 |

OTHER PUBLICATIONS

Talwar, V. et al.; "Comparison of Approaches to Service Deployment"; Jun. 10, 2005; 10 pages.
Extended European Search Report received in EP Application No. 12875325.8, dated Oct. 14, 2015, 6 pages.
International Preliminary Report on Patentability received in PCT Application No. PCT/US2012/035334, Nov. 6, 2014, 5 pages.

\* cited by examiner

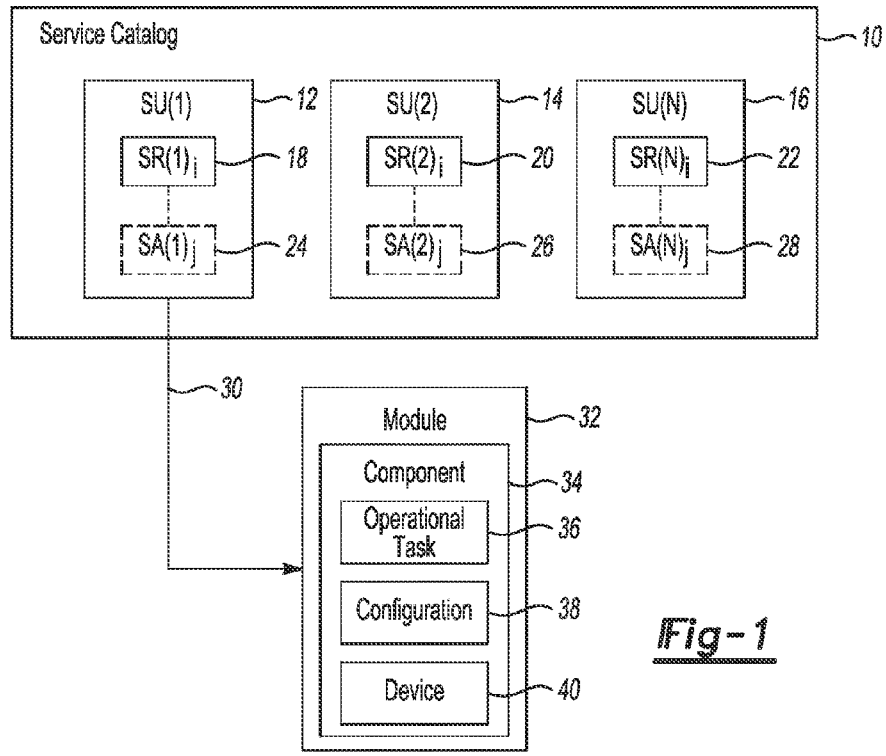
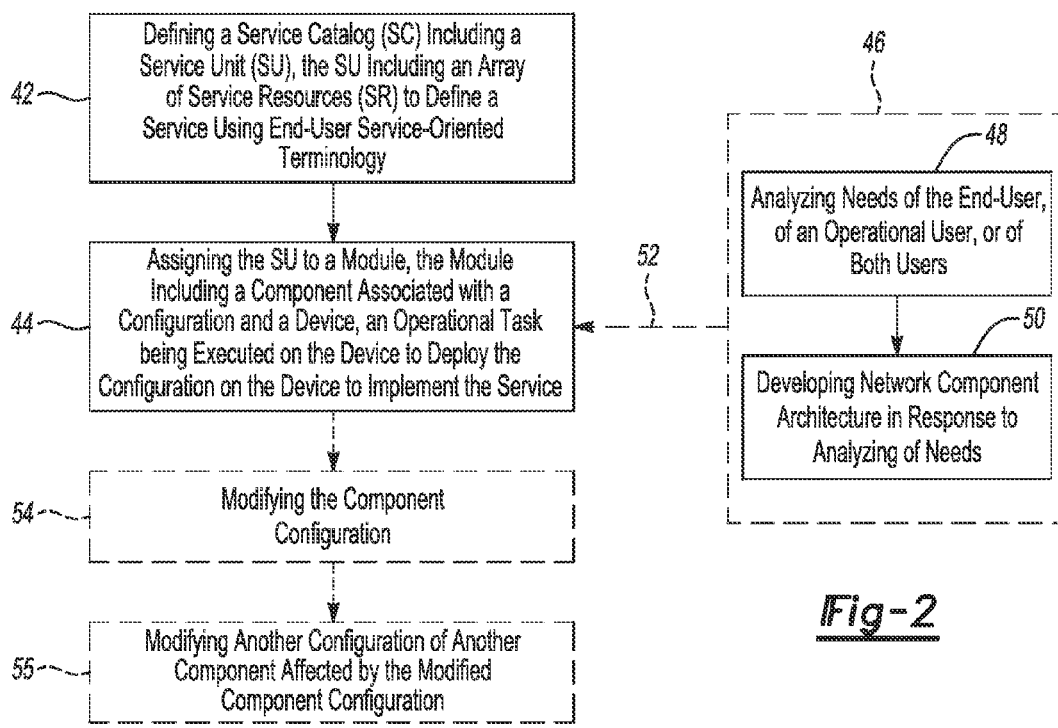

DATA CENTER SERVICE ORIENTED NETWORKING

BACKGROUND

Enterprise computing systems include networks having many channels and pathways for secure information transfer. Some networking environments may include end-user interaction to maintain network components and configurations for service delivery to the end-user.

BRIEF DESCRIPTION OF THE DRAWINGS

Features and advantages of examples of the present disclosure will become apparent by reference to the following detailed description and drawings, in which like reference numerals or characters correspond to similar, though perhaps not identical, elements. For the sake of brevity, reference numerals, characters, or features having a previously described function may or may not be described in connection with other drawings in which they appear.

FIG. 1 is a schematic illustration of an example of a service catalog with an example of a service unit (SU) implemented on an example of a module according to the present disclosure;

FIG. 2 is a flow diagram depicting an example of implementation of a service catalog (SC), and an example of maintenance of a service catalog (SC) according to the present disclosure;

DETAILED DESCRIPTION

Figure 3:
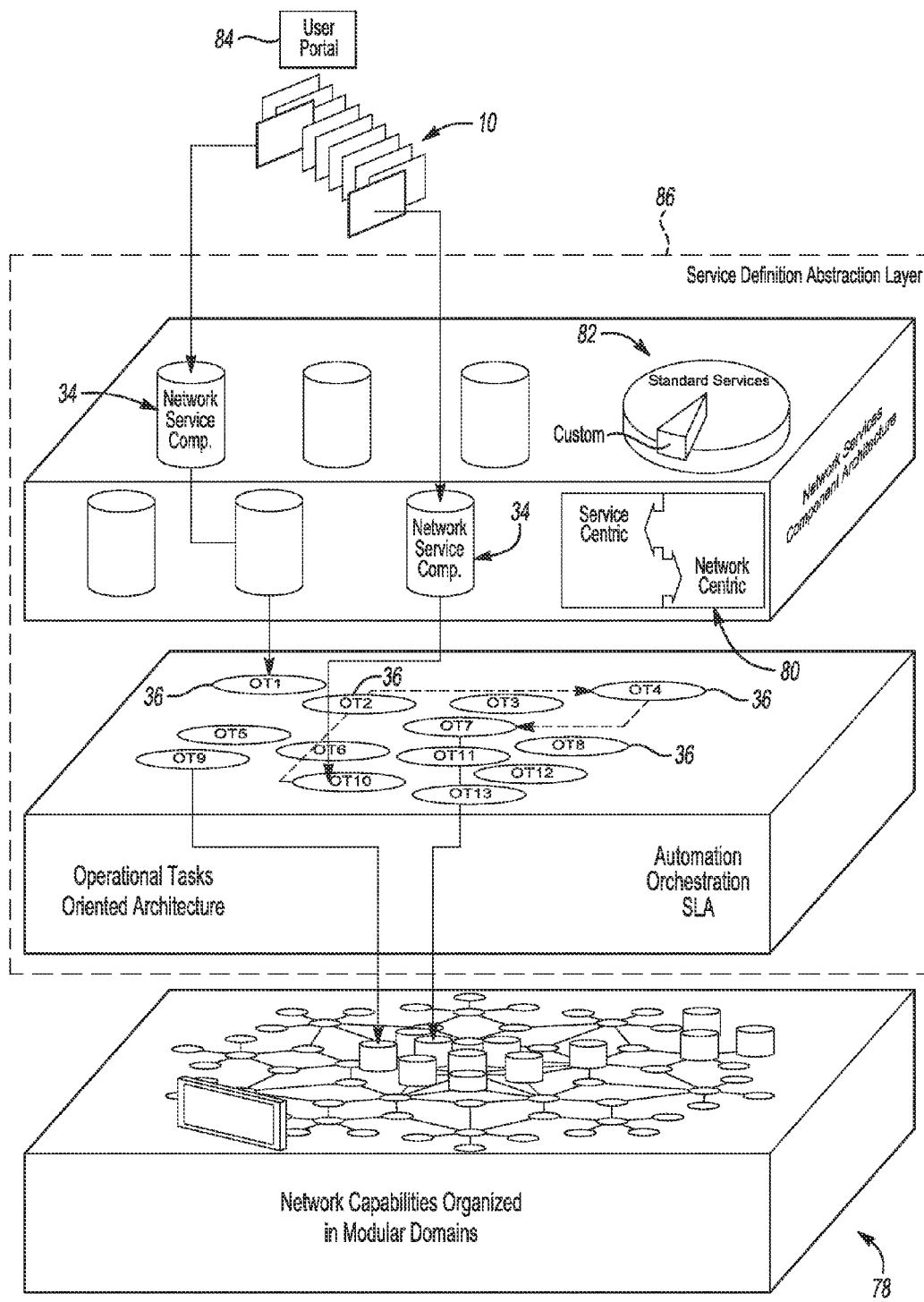
FIG. 3 schematically depicts an overall view of an example of a system according to the present disclosure.

The present disclosure relates generally to data center networking and services related thereto.

The network was historically seen as a dedicated infrastructure designed to provide connectivity between different points of the Information Technology topology. Social, financial and technological influences are reducing the competitiveness of some network environments. Network users may request seamless, secure, and reliable access to any information, service, person, or partner at any time. Historically, over-provisioning of network resources was a frequently-used tool for providing flexibility to absorb changing usage without the expense of complete redesign. However, virtualization, convergence and Cloud technology may make over-provisioning an uncompetitive strategy in the network service market.

In examples of the present disclosure, network complexity is hidden to service requestors who may be engaged only at the initial service request stage. After the initial service request, activities may be performed by network operations with substantially no additional interaction with the service requestor (end-user). Further, examples of the present disclosure include a streamlined network architecture, where each pre-qualified request can be satisfied applying a defined process. As such, predictability of costs and levels of service are both improved.

Examples of a system and method as disclosed herein implement a service definition abstraction layer with an operational model based on Operational Tasks to enable design, implementation, deployment and lifecycle management of Networking Services into a Data Center. Further, examples of a system and method as disclosed herein include a networking service catalog (SC) and a network component architecture. The SC may include services relevant to business purposes of an end-user. The network component architecture may be transparent to an end-user who selects a service from the SC without knowledge of underlying hardware, software, and connections needed to implement the services. The services may be implemented by a data center networking service provider.

According to examples herein, at least three types of services are provided for: Information technology (IT) Infrastructure Services, Application Services, and Business Services. IT Infrastructure Services include Data Center Local Area Network (DC LAN), firewalling, load balancing, etc. IT Infrastructure Services may not be perceived by business users as being part of IT operations. Application Services include network-based services, network-enabled services, mobile services, unified communications and collaboration (UC&C) services, etc. Application Services are accessible by business users. Business Services include Business Intelligence and vertical or Industry applications, etc. With Business Services, the network enables access and data transportation, including possible security performance, isolation, etc.

Services such as the above may be implemented, as in examples described herein, in a data center network, for example, as data center service oriented networking. Such a data center network has a networking infrastructure including, e.g., core switches, firewalls, load balancers, routers, and distribution and access switches, etc., along with any hardware and software required to operate the same. Some or all of the networking services may be implemented from a location remote from the end-user and delivered from the remote location to the end-user. DC service oriented networking may provide for a flexible environment by providing networking capabilities to devices in the form of resource pools with related service attributes. Service costs may be charged as predefined units with the attributes used as predefined. Examples of the present disclosure may be implemented through use of hardware, associated programming, or a combination thereof.

FIG. 1 depicts a schematic illustration of an example of a service catalog (SC) 10 according to the present disclosure. An SC 10 includes one or more service units (SUs) 12, 14, 16. The SU 12, 14, 16 is the top-level description of a service including a set of capabilities delivered by the network. For example, such capabilities may be ports, IP addresses, type of network, etc. The SU 12, 14, 16 is associated with attributes such as bandwidth, latency, load balancing, etc. to define a service profile as related to a service level agreement (SLA) for the service. It is to be understood that SC 10 may have any number of SUs 12, 14, 16, as indicated in FIG. 1 by SU(1) 12 being one SU in SC 10; SU(2) 14 being another SU in SC 10; and SU(N) 16 representing any number of additional SUs where N is the total number of SUs.

The SUs 12, 14, 16 each include corresponding service resources (SRs) 18, 20, 22, respectively. An SR is an array of parameters, including service resource information, which defines the minimum characteristics of an SU. Therefore, an SR includes those characteristics to minimally define the service and no more. In an example, each SR included in an SU is selected for inclusion in the SU based upon an analysis of needs of the end-user, of an operational user, or of both users. For example, end-users (application architects, service architects, demand managers) may have business or technical needs, and operational users may have operational needs related to network operations. SR(1)i 18 represents the SR parameters for SU(1), where SR(1)i may include any number of parameters, from 1 to i, where i is an integer 1 or greater. SR(2)i 20 represents SR parameters for SU(2), and SR(N)i (22) represents SRs for each SU up to SU(N).

Table 1 below is an example of an SR array.

TABLE 1

| SR | Description | Comments |
|---|---|---|
| 1 - Module name | Module identifier | Free alphanumeric description of Module name, to make it recognizable by association with appropriate service |
| 2 - # of layers | Number of layers in the Module | Iterated as many layer are defined Value: 2 (1 VLAN + heartbit), 3, 4 |
| 2i - # of VLAN per layer | Number of VLAN in each layer | Iterated per layer. VLAN size (all VLAN of the layer) is assigned to default value Small (IP Mask: /25) |
| 3 - layer size | DEFAULT: Number of IP addresses (thus related to quantity of devices) requested per layer | Applied to each layer. Default = "Mail service" (best effort) |
| 4 - SLO (Service Level Objective) | DEFAULT - Basic QoS applied to all VLAN of the layer | Applied to the whole environment as ACL or Firewall rules. It is described from application standpoint. Default = "open - no restriction" (only basic security policies are applied on network components) |
| 5 - Security | DEFAULT - Basic level of security assigned to ALL Modules | A minimum acceptable security level common to all DC infrastructure |

In the example shown in Table 1, an SR array is described by five values. Each of them is expressed to be understandable by an application or business service architect. Two (QoS and Security) are set as Default. Without such Default SR, the service description would be incomplete. The service description may be varied by SAs (see, e.g., Table 2 below). If no SA is applied or SAs are removed after deployment, the default value is restored. Moreover, if any change is needed to all configurations (e.g., enhanced security policies), related SRi will be changed, and new configurations may be automatically deployed (e.g., via a batch execution) to all existing Modules. Therefore, alignment is provided on the basis of fully predictable impact analysis because all deployed configurations belong to a defined set.

In another example, an SU may also include a service attribute (SA), as indicated by the dashed lines at boxes 24, 26, 28. An SA is an array of parameters that may be used to define a state for a respective SR from the array of SRs. In an example, a state for a respective SR may be defined by adjusting or adding to the SR values. For example, in Table 2 below, SAs "A" and "B" adjust a value for SR#4 and SR#5, respectively. SA "C" adds to the SR values by adding a new kind of configuration. As such, the SR values may be considered default values, and SAs may or may not be included with a particular SU. An SRi must be set, whereas an SAj may or may not be set. For example, there could be an empty array of SA. Further, each SA may have its own number of parameters as indicated by the letter j, for example, as in SA(1)j 24, SA(2)j 26, and SA(N)j 28. For instance, SA(1) may have 5 parameters, and SA(2) may have 2 parameters, etc.

As depicted by Table 2 below, attributes may be assigned, changed, or removed because the SU will consistently be described by an SR array.

TABLE 2

| SA | Description | Comments |
|---|---|---|
| A - layer SLO | QoS applied to a specific VLAN or layer | Related to SR #4. Each QoS is described in terms of application use (Mail = best effort service; File = high bandwidth; DB = resiliency and performances guaranteed; Video = High bandwidth) |
| B - security | Level of security applied to a specific layer | Related to SR #5. Security level is described as "open" (default, SR), "DMZ", "Back-end", "Critical". Related policies and configuration may be deployed on more components |
| C - port configuration | Specific port configuration on firewall for a layer | Requestor should specify a list of ports to be opened on firewall. Request is fulfilled only after a manual review by security supervisor |
| D - layer size | Size of the layer expressed by assigning appropriate IP Mask | Related to SR #3. Each layer has same size assigned to all VLAN of the layer (by design): Small (/25) is default (SR); Medium (/24); Large (/23, not further extensible) |

For example, as shown in Table 2, according to planned services, SA may be applied upon request to one or more VLAN, one or more layer, or all the Modules. SA (A), (B) and (D) supersede the default related SR values if the SAs are used. Further, if an SA is assigned to an already existing configuration, additional operations on other devices (e.g., servers) may be required. For example, configuration of an IP Mask should be applied to servers to make an extension operable.

Some example SUs are shown below in Table 3.

TABLE 3

| SU | Comments |
|---|---|
| [CREATE] {SR}={Basic; 3; 2; Mail; Open} | Module "Basic" has 3 layers, 2 LAN per layer, SLO "Mail server" applied to all VLANs, "Open" security level applied to all VLANs. Minimal configuration |
| [CREATE] {SR}={Large; 3; 4; Mail; Open} {SA}={;;;1-large, 2-large, 3-large} | Same as above but with addition of attributes "large" to all VLAN of all 3 layers, and 4 VLAN per layer. Module name is "Large", {SA} are applied immediately after the Module creation |
| [CREATE] {SR}={Big data; 3; 2; Mail; Open} {SA}={3-DB;3-Back End;;3-large} | "Big Data" Module has a large back-end, positioned on layer-3, to manage big data with high level of security and guaranteed performances |
| [CHANGE=Basic] {SA}={1-File; 2-File} | Service change is applied to "Basic" Module, by increasing to "File" SLO applied to layer 1 and 2. Layer 3 is unchanged |
| [REMOVE=Big Data] | Module "Big Data" is removed, all resources made available for further reuse |

Legend for Table 3:
{SR} = {Domain name; # layers; # VLAN per layer; layer size; layer SLO; security}
{SA} = {layer SLO; security; port configuration; layer size}

With further reference to FIG. 1, delivery of the service as defined by a selected SU includes assignment of the SU to a module. In an example, as depicted by arrow 30, SU(1) 12 may be implemented on a module or a plurality of modules, for example, module 32. It is to be understood that each SU 12 may include identifiers to be clearly distinguished from other, similar SUs. The identifiers have substantially no effect on the service that the SU is expected to deliver, however, the identifiers may facilitate replicating other instances of similar SUs on other modules. An example of an identifier may be a NAME of an SU, e.g., "CRM-SFA test", "CRM-Billing Production", etc., an alphanumeric IDENTIFIER, or other tags.

Module as used herein is a logical space that includes a component (e.g., component 34 as part of module 32). A component includes one or more services of the same type. Examples of component 34 may include: Security (configuration of firewall (FW) and access control list (ACL)); Performance (traffic priority and tagging on switches, ACL on switches); Reliability (load balancing (LB) and clustering); and Switching/Routing. Component 34 is associated with operational task(s) 36, configuration(s) 38, and device(s) 40. In examples of the present disclosure, component 34 may be a plurality of components 34, each associated with its own respective operational task(s) 36, configuration(s) 38, and device(s) 40. For example, one component may be associated with switching/routing, and another component associated with security implemented as a combination of Access Control List (ACL) on switches and rules on a firewall for a respective module.

As used herein, a device 40 may be anything connected to the network (physically or virtually) upon which a service is implemented. Examples of a device 40 may include: servers (physical or virtual); storage (logical unit number (LUN)) and tape libraries, connected via internet small computer systems interface (iSCSI), fiber channel over Ethernet (FCoE), network attached storage (NAS)); personal computers (PC); and printers. Devices may also include interface(s), e.g., wired and/or logical connections to support various functionality, including, e.g., deployment of the component 34. Each respective device 40 is configured to be deployed when performing the selected service of the component 34.

An operational task (OT) as used herein means a well-defined, predictable set of instructions that are associated with performing the service. OTs may be executed by human operators, proceeding according to defined procedures with no interaction with the requestor (e.g., an application architect). An OT may be common or unique and may be used in multiple modules. In examples of the present disclosure, an OT that is executable by human operators may be converted to an automatically executed program OT by a straightforward transformation. A program OT is an OT that includes a program that is loaded in memory and associated with performing the service. A program OT will be executed by a CPU in accord with the program at the next clock cycle as address registers have been loaded with the initial address of the program.

It is to be understood that module 32 may include various components 34 within one module 32. Further, a component 34 may include multiple operational tasks, configurations and devices. In an example, one or more operational tasks may be activated upon a single request. For instance, a single request may include first configuring a switch, then configuring security, in order to deploy a respective SU in a module. Additionally, the operational tasks may be unique to each component or used commonly in multiple components, along with associated configurations and devices.

As mentioned above, the end-user is not required to have knowledge of the underlying networking structure for implementation of the service. As such, the end-user is not required to know the technical devices/components included in implementation of a service. The end-user is further not required to have knowledge of technical information (e.g., language, interfaces, operating system, etc.) for executing the service. The end-user has an understanding of the services sufficient to request a service because the SUs, SRs, and SAs are all described in a native language of the end-user. Through the service definition abstraction layer (e.g., as depicted at reference numeral 86 in FIG. 3, discussed further below), definition of the SUs, SRs, and SAs uses end-user service-oriented terminology in examples of the present disclosure. As used herein, end-user service-oriented terminology is meant to include customer-specific service descriptions under a service level agreement (SLA).

In an example, a system for delivering data center networking as a service may include an SC engine. The SC engine represents, generally, any combination of hardware and programming configured to cause execution of networking services in a data center environment. The SC engine may include an SC front end to interface with an end-user. In an example, the end-user may select a networking service from a list of SUs. The SC engine may also include an SC back end to implement the networking services on the network in response to the selected networking service.

According to an example of the present disclosure, services may be consolidated into predefined sets selectable as a single entity. In another example, each SR may be individually selected from a predefined set (e.g., see Table 1 above). Although in some examples, predefined sets are included to limit the possible combination of services (e.g., to remove some complexity), it is to be understood that, in other examples, SRs may be "free." For example, NAME or IDENTIFIER may be a free input. ALLOWED PORTS may also be a free input field, where a user can specify which specific non standard ports should be opened on the FW to allow an application to work.

Referring now to FIG. 2, an example of a method according to the present disclosure includes defining an SC including an SU, the SU including an array of service resources (SR) to define a service using end-user service-oriented terminology, as depicted at box 42. The example method further includes assigning the SU to module 32, the module 32 including component(s) 34 associated with configuration 38 and device 40. The operational task 36 is executed (automatically or by the operational user) on the device(s) 40 to deploy the appropriate configuration 38 on the device(s) 40 to implement the service, as depicted at box 44.

In another example, as shown in FIG. 2 in dashed line generally at box 46, the method may further include analyzing needs of the user, as depicted at box 48. The needs that are analyzed may depend on the type of user having the needs. As mentioned above, the user may be, for example, an end-user (e.g., application architect, service architect, demand manager, etc.) who may have business or technical needs to be analyzed. An operational user (e.g., user who runs the network) may have operational needs. The needs of the user may be developed, e.g., according to surveys or audits of existing infrastructure. Alternatively, the needs may be provided according to a set of best practices. Best practices may be developed directly by the provider of the DCN (data center network). For example, an internal IT organization that directly operates a DC may develop best practices. Best practices may also be developed indirectly by arrangement with a third party. For example, best practices may be developed by a consultative practice to define a transformational or an evolutionary DCN roadmap.

In response to this needs analysis, a network component architecture may be developed, as depicted at box 50. It is to be understood that, in an example, activity related to box 46 may happen before or after definition of the SC 42 and additionally, such activity may happen before or after assignment of an SU to a module 44. One of these sequencing options for box 46 is depicted generally by dashed arrow line 52.

Still referring to FIG. 2, in another example, the method may further include modifying module 32 by modifying a component configuration, as depicted in dashed line at box 54. Further, other modules 32 may use the same modified component configuration. As such, the other modules 32 may be updated to incorporate the change into the affected component configurations. Modifying another configuration of another component affected by the modified component configuration is depicted in dashed line at box 55. For example, two or more modules 32 may share a component 34, and when a component configuration in a particular module 32 is changed, the component configuration in another module(s) 32 will change also.

However, in another example, component configuration in one module 32 does not have to affect other modules. For instance, two or more modules 32 may share a component 34, and a component configuration in a particular module 32 may be changed with no impact on the other module(s) 32. This may be accomplished by modification of an SAi value, applying the new value to one module 32 and not to other modules 32. For example, an additional security rule may be introduced to grant compliance to a single module, and therefore can be applied to one module 32 and not to other modules 32.

In an example, a network may have a domain including one or more modules categorized by the domain. Further, a network may have multiple domains. Domains group resources for modules internal to a domain, and may be organized according to business units. For example, a customer relations management (CRM) domain may include various modules to perform services associated with a CRM business unit. Modules may share resources within a common domain, whereas a domain maintains separate resources from other domains.

FIG. 3 schematically depicts an overall view of an example of a system as disclosed herein. The end-user accesses the service catalog 10. The service catalog 10 includes services described through the user portal 84 in a language that is understandable to the end-user. The service catalog 10 contains a list of predefined and pre-approved services which may cover at least a portion of a company's IT network requirements, as schematically depicted by pie chart 82.

The Network Service Components shown in FIG. 3 are examples of component 34. Component 34 is an abstract element used to define a service. The component 34 has some similarity to a "procedure call" or "library function" in a programming language. When the component 34 is called with specific parameters, the component creates or changes a networking service. As stated above, a service means a set of capabilities delivered by a network. In examples of the present disclosure, services may be provisioned in standardized and predefined modules.

The service definition abstraction layer depicted at 86 virtualizes physical assets' capabilities to the form of standard service components 34. As depicted by image 80, end-user, service-centric requests are translated into deployment instructions to the provider of networking services in a networking language. It is to be understood that the provider of networking services may be in a separate business organization from the end-user, or in the same business organization. A request for a service triggers a set of standard operational tasks 36 which select physical capabilities and how the physical capabilities are to be provisioned to satisfy the request for the service. Operational tasks 36 may also be de-provisioned by reverting actions performed by Operational tasks 36 to free DCN resources and related SUs.

Operational Task Oriented Architecture is a utilization of Service Oriented Architecture of software in the network space. There are many actions that a plurality of networking services may perform in a substantially similar manner. Such actions may be combined in the form of atomic Operational Tasks 36. Service Components 34 provision networking services by executing a set of Operational Tasks 36 in a particular order.

Examples disclosed herein may provide resilience to changes. For example, if a hardware component in the network is changed, it may not be necessary to re-write all networking services (as it would be in currently existing data centers). It is to be understood, however, that new hardware-specific commands may be added to the Operational Tasks 36 workflows in some instances—for example, if the hardware has a new operating system.

Still referring to FIG. 3, the pool of physical network capabilities 78 may include switching, load balancing, firewalling, intrusion detecting, event correlation, etc. In an example, the pool of physical network capabilities 78 may have modular domains and be architecturally based on a Hewlett-Packard Data Center Reference Architecture model. In an example, physical capabilities may be provisioned in the form of standard, independent modules in response to a service request. Such provisioning is in contrast to a system in which allowance for growth or other changes is accommodated by over-provisioning.

Figure 4:
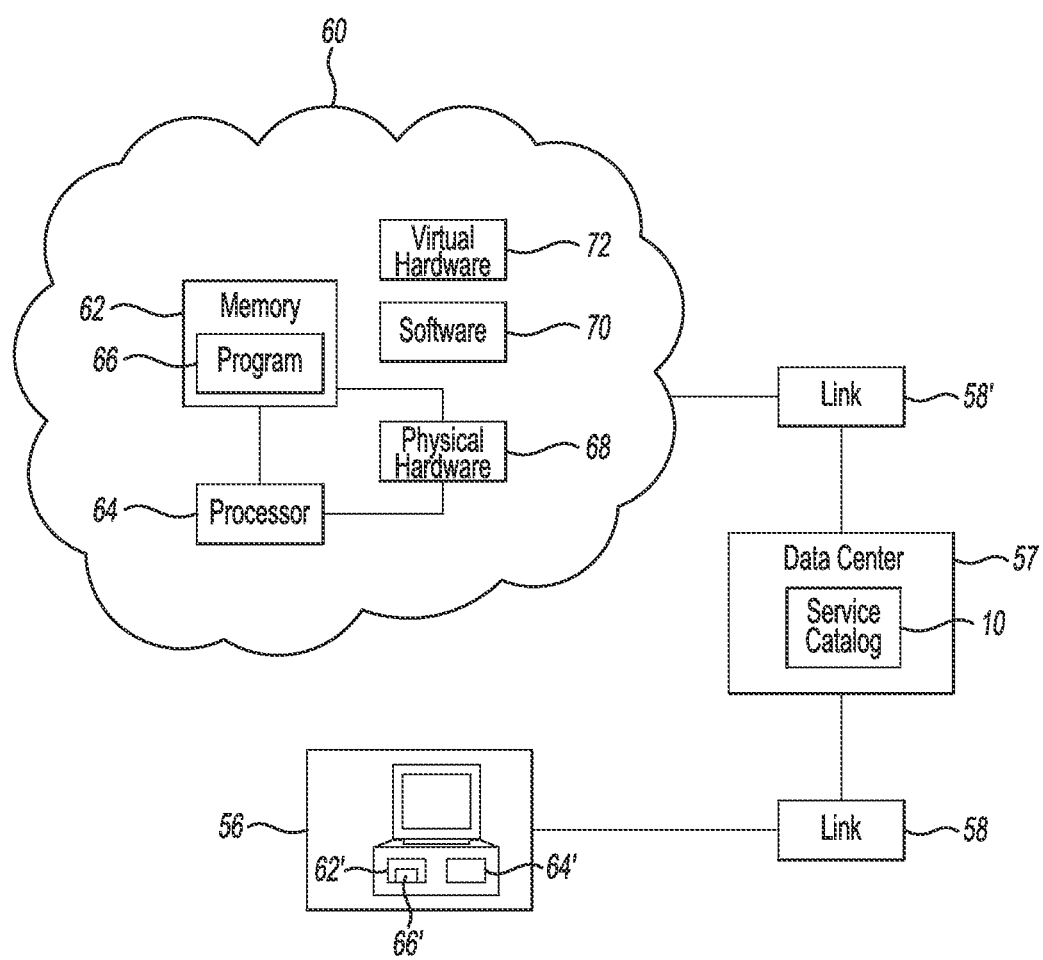
FIG. 4 is a schematic view of an example of a service catalog (SC) in an example of a data center as part of a local system, a remote system, and/or a cloud computing system according to the present disclosure.

FIG. 4 depicts an example of an SC 10 in an example of a data center 57 according to the present disclosure. Examples of an SC 10 are implemented as part of any of a local system, a remote system, and a cloud computing system. The SC 10 as shown in FIG. 4 is implemented and supported by various elements having hardware, software, or a combination thereof. As illustrated in FIG. 4, the data center 57 may be operatively connected to a local or remote user computing system 56 via a link 58 or to a cloud computing system 60 via a link 58', or to both systems 56, 60. It is to be understood that the local or remote user computing system 56 may include one or more standalone computing systems 56 and/or a network of computing systems 56. The links 58, 58' may be one or more of cable, wireless, fiber optic, or remote connections via a telecommunication link, an infrared link, a radio frequency link, or any other connectors or systems that provide electronic communication. Links 58, 58' may include, at least in part, an intranet, the Internet, or a combination of both. The links 58, 58' may also include intermediate proxies, routers, switches, load balancers, and the like.

The computing system 56 may be any personal computer, portable computer, content server, a network PC, a personal digital assistant (PDA), a cellular telephone or any other computing device that is capable of performing the functions for receiving input from, and/or providing control or driving output to the data center networking architecture associated with examples of the SC 10 as disclosed herein.

As illustrated in FIG. 4, the programming may be processor executable instructions stored on non-transitory, tangible memory media 62, 62', and the hardware may include a processor 64, 64' for executing those instructions. In an example, the memory 62, 62' stores program instructions that, when executed by respective processors 64, 64', implement data center service delivery via SC 10 as disclosed herein. The program 66, 66' represents examples of these program instructions.

It is to be understood that the memory 62, 62' may be integrated in the same respective device as the processors 64, 64', or it may be separate from, but accessible to the respective computing systems 60, 56.

In an example, the program instructions may be part of an installation package that can be executed by the processor 64' to implement the program 66'. In these instances, the memory 62' may be a portable medium, such as a compact disc (CD), a digital video disc (DVD), or a flash drive; or the memory 62' may be a memory maintained by a server from which the installation package can be downloaded and installed on the computing system 56. In another example, the program instructions may be part of an application or applications already installed on the computing system 56. In this other example, the memory 62' may include integrated memory, such as a hard drive.

As used herein, the cloud computing system 60 refers to a computing system including multiple pieces of hardware operatively coupled over a network so that they can perform a specific computing task. The cloud 60 may include a combination of physical hardware 68, software 70, and virtual hardware 72. The cloud computing system 60 is configured to (i) receive requests from the computing system 56 (or from users using the computing system 56), and (ii) return request responses. As examples, the cloud computing system 60 may be a private cloud, a public cloud or a hybrid cloud. Further, the cloud 60 may be a combination cloud computing system including a private cloud (or multiple private clouds) and a public cloud (or multiple public clouds).

The physical hardware 68 may include, among others, processors, memory devices, and networking equipment. The virtual hardware 72 is a type of software that is processed by the physical hardware 68 and designed to emulate specific hardware. As an example, virtual hardware may include a virtual machine (VM), i.e., a software implementation of a computer that supports execution of an application like a physical machine.

An application, as used herein, refers to a set of specific instructions executable by a computing system for facilitating carrying out a specific task. For example, an application may take the form of a web-based tool providing users with a specific functionality. It will be understood that an application as used herein refers to an application supporting performing a specific task using computing resources such as, among others, enterprise applications, accounting applications, multimedia related applications, or data storage applications. Software 70 is a set of instructions and data configured to cause virtual hardware 72 and/or physical hardware 68 to execute an application. As such, the cloud computing system can render a particular application available to users associated with the data center 57.

Executing an application in the cloud 60 may involve receiving a number of requests, processing the requests according to the particular functionality implemented by the application, and returning request responses to the requesting computing system 56. For executing the application, the resources (e.g., physical hardware 68, virtual hardware 72, and software 70) of the cloud computing system 60 may be scaled depending on the demands posed on the application. For example, cloud 60 may vary the size of the resources allocated to the application depending on the number of requests, the number of users interacting with the application, or requirement on the performance of the application (e.g., a maximum response time). While not shown, it is to be understood that the cloud 60 may also include an interface that allows the computing device(s) 56 to communicate with the components of the cloud 60.

Referring still to FIG. 4, the physical hardware 68 of the cloud computing system 60 may include processor 64 and memory 62. The processor 64 may be any processor that is capable of executing program instructions stored in the memory 62 to implement, for example, the program 66 so as to implement examples of the data center service catalog 10 as disclosed herein. The memory 62 may include an operating system and applications, such as a data center networking service application. The operating system may be a collection of programs that, when executed by the processor 64, serves as a platform on which the data center networking service application can run. Some examples of operating systems include various versions of Linux® and Microsoft Windows®.

In the cloud computing system 60 of FIG. 4, the program 62 may have the hardware portions implemented as the processor 64 and may have the programming portions implemented as the operating system and applications. As such, the computing system(s) 56 may utilize the services of the cloud 60 to achieve desired functionality.

The figures set forth herein aid in depicting various architectures, functionalities, and operations of the examples disclosed herein. Throughout the description, many of the elements are defined, at least in part, as programs, programming, or program instructions. Each of these elements, portions thereof, or various combinations thereof may represent in whole or in part a module, segment, or portion of code that includes one or more executable instructions to implement any specified logical function(s). Each element or various combinations thereof may represent a circuit or a number of interconnected circuits to implement the specified logical function(s).

The examples disclosed herein may be realized in any non-transitory, tangible computer-readable media for use by or in connection with an instruction execution system (e.g., computing systems 60, 56), such as a computer/processor based system, or an ASIC (Application Specific Integrated Circuit), or another system that can fetch or obtain the logic from computer-readable media and execute the instructions contained therein. Non-transitory, tangible computer-readable media may be any media that is capable of containing, storing, or maintaining programs and data for use by or in connection with the computing systems 60, 56. Computer readable media may include any one of many physical media such as, for example, electronic, magnetic, optical, electromagnetic, or semiconductor media. More specific examples of suitable computer-readable media include a portable magnetic computer diskette such as floppy diskettes or hard drives, a random access memory (RAM), a read-only memory (ROM), an erasable programmable read-only memory (EPROM), or a portable CD, DVD, or flash drive.

Examples of the system and method as disclosed herein implement a service definition abstraction layer 86 with an operational model based on Operational Tasks 36 to enable design, implementation, deployment and lifecycle management of Networking Services into a Data Center. The service definition abstraction layer 86 allows an end-user of networking services to select capabilities provided by a plurality of networking devices by specifying a single service component in a language understood by the end-user.

To illustrate a benefit of examples of the present disclosure, a comparison may be made to networking services in an existing data center (that does not use examples of the present disclosure). Security rules in such an existing data center are generally implemented separately into a firewall, an intrusion prevention system (IPS), and switches. As such, the security rules in the existing data center may be managed by different teams, designed in different ways, and deployed using different command languages by different specialists. A service call in such an existing data center network may involve a plurality of hardware systems, technologies and languages.

In sharp contrast, examples of the system and method as disclosed herein allow an end-user to define a service without knowledge of the technical devices/components, languages, interfaces or operating system included in implementation of the service. More specifically, for comparison to the example of the security rules in the existing data center, the end-user in examples of the present disclosure may select security rules from choices that use words that are easily understood by the end-user (e.g., "open", "DMZ", "Back-end", etc.). The service may be implemented by a data center networking service provider. As such, examples of the system and method as disclosed herein constructively convert vertical technical silos into horizontal service components.

Still further, examples of the system and method as disclosed herein allow an end-user to define a service from an SC using a non-network language for "users" while providing deployment instructions to the provider of networking services in a networking language understood by network operators in the data center. Examples of the present disclosure may include a service interface that is understandable by end-users even though implementation of the service component is networking-specialized.

It is to be understood that the terms "connect/connected/connection" and/or the like are broadly defined herein to encompass a variety of divergent connected arrangements and assembly techniques. These arrangements and techniques include, but are not limited to (1) the direct communication between one element and another element with no intervening elements therebetween; and (2) the communication of one element and another element with one or more elements therebetween, provided that the one element being "connected to" the other element is somehow in operative communication with the other element (notwithstanding the presence of one or more additional elements therebetween).

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A non-transitory, tangible machine readable storage medium storing instructions that when executed by a processor cause the processor to:
define a service catalog including a list of different types of service units, each of the service units including a description of an array of service resources in end-user service-oriented terminology describing a level of security and quality of service of a networking service to be provided by the respective service unit, the array of service resources specific to a type of service unit;
select a network component architecture based on a type of user; and
assign one of the service units to a module, the module including a component associated with a configuration and a device, an operational task being executed on the device to deploy the configuration on the device to implement the networking service via the selected network component architecture; and
modify the configuration associated with the component by applying a service attribute to a service resource of the array of service resources, the service attribute to adjust a parameter of the service resource or add a new parameter to the service resource.

2. The non-transitory, tangible machine readable storage medium as defined in claim 1, wherein each of the service units further includes an array of service attributes, each of the service attributes to define a state for a respective service resource from the array of service resources specific to the type of service unit.

3. The non-transitory, tangible machine readable storage medium as defined in claim 1, wherein selecting the network component architecture comprises:
analyzing needs of the end-user, of an operational user, or of both users; and
developing a network component architecture in response to the analysis of the needs.

4. The non-transitory, tangible machine readable storage medium as defined in claim 1, wherein the method further comprises
modifying another configuration of another component affected by the modified configuration.

5. A system for delivering data center service oriented networking, the system comprising:
a network including a domain having a first module categorized by the domain, the first module including a component to execute an operational task; and
a service catalog engine, including a hardware component and a computer readable storage medium storing instructions that when executed by the hardware component cause the hardware component to:
define a service catalog including a list of different types of service units, each of the service units including a description of an array of service resources in end-user language describing a level of security and quality of service of a networking service to be provided by the respective service unit,
receive, on an interface with an end-user, a selection of a service unit from the list of different types of service units,
select a network component architecture based on a type of the end-user; and
implement the networking service on a network via the network component architecture, in response to the selected service unit; and
modify the networking service by applying a service attribute to define a state for a service resource of the array of service resources, the service attribute to adjust a parameter of the service resource or add a new parameter to the service resource.

6. The system as defined in claim 5, wherein each service resource in the array of service resources is selected for inclusion in a respective service unit based upon an analysis of needs of an operational user, of the end-user, or of both users.

7. The system as defined in claim 5, wherein the domain further includes another module including another component.

8. A method for delivering service oriented networking, the method comprising:
    defining a service catalog including a list of different types of service units, each of the service units including a description of an array of service resources in end-user service-oriented terminology describing a level of security and quality of service of a networking service to be provided by the respective service unit;
    selecting a network component architecture based on a user type; and
    assigning one of the service units to a first module, the first module including a component associated with a configuration and a device, an operational task being executed on the device to deploy the configuration on the device to implement the networking service via the selected network component architecture; and
    modifying the configuration associated with the component of the first module by applying a service attribute to a service resource of the array of service resources, the service attribute to adjust a parameter of the service resource or add a new parameter to the service resource.

9. The method as defined in claim 8, wherein each service unit includes an array of service attributes, each of the service attributes to define a state for a respective service resource from the array of service resources specific to a type of service unit.

10. The method as defined in claim 8, wherein selecting the network component architecture comprises:
    analyzing needs of the end-user, of an operational user, or of both users; and
    developing the network component architecture in response to the analysis of the needs.

11. The method as defined in claim 8, wherein modifying the configuration associated with the component of the first module; and modifying modifies a component configuration of a second module that shares the component with the first module.

12. The system as defined in claim 5, wherein the service units are associated with one of an information technology (IT) infrastructure service, an application service, and a business service.

13. The system as defined in claim 5, wherein the array of service resources are specific to a type of service unit.

14. The system as defined in claim 5, wherein the array of service resources define minimal characteristics specific to the type of service unit.

15. The method as defined in claim 8, wherein the different types of service units include a combination of an information technology (IT) infrastructure service, an application service, and a business service.

16. The method as defined in claim 8, wherein modifying the configuration associated with the component by applying a service attribute modifies the first module and not a second module sharing the component.

17. The system as defined in claim 5, wherein modifying the networking service includes modifying a configuration associated with the first module component, and wherein modifying the configuration associated with the first module component modifies a component configuration of a second module that shares the component with the first module.

18. The system as defined in claim 5, wherein modifying the networking service includes modifying a configuration associated with the first module component, and wherein applying a service attribute to modify the configuration associated with the first module component modifies the first module and not a second module sharing the component.

19. The non-transitory, tangible machine readable storage medium as defined in claim 2, wherein a state of a service resource is defined as the addition or adjustment of a service attribute to a service resource default value specific to a type of service unit.

20. The method as defined in claim 9, wherein a state of a service resource is defined as the addition or adjustment of a service attribute to a service resource default value specific to a type of service unit.

* * * * *